United States Patent
Eromäki

(10) Patent No.: US 6,993,128 B2
(45) Date of Patent: Jan. 31, 2006

(54) PORTABLE ELECTRONIC DEVICE

(75) Inventor: Marko Eromäki, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 581 days.

(21) Appl. No.: 09/836,406

(22) Filed: Apr. 17, 2001

(65) Prior Publication Data

US 2001/0031644 A1    Oct. 18, 2001

(30) Foreign Application Priority Data

Apr. 18, 2000    (FI) ................................. 20000931

(51) Int. Cl.
*H04M 1/00*    (2006.01)
*H04B 1/38*    (2006.01)

(52) U.S. Cl. .................. 379/433.12; 379/433.07; 455/575.4

(58) Field of Classification Search ........ 379/433.11, 379/433.12, 433.13, 433.07; 455/575.4, 455/575.3; 345/156
See application file for complete search history.

(56) References Cited

U.S. PATENT DOCUMENTS 5,151,946 A    9/1992 Martensson ................ 379/38
6,667,738 B2 *  12/2003 Murphy ....................... 345/156
6,748,249 B1 *  6/2004 Eromaki et al. ........ 455/575.4

FOREIGN PATENT DOCUMENTS

| EP | 0414365 A2 | 2/1991 |
|---|---|---|
| EP | 650282 A1 | 4/1995 |
| EP | 0961456 A1 | 12/1999 |
| EP | 1051012 A2 | 11/2000 |
| EP | 1054551 A2 | 11/2000 |
| EP | 1075125 A2 | 2/2001 |
| GB | 2350516 | 11/2000 |
| WO | WO 98/09414 | 3/1998 |
| WO | WO 00/21155 | 4/2000 |

OTHER PUBLICATIONS

** English equivalent of Finnish Patent document No. 991007.

* cited by examiner

*Primary Examiner*—Jack Chiang
(74) *Attorney, Agent, or Firm*—Perman & Green, LLP

(57) ABSTRACT

A portable electronic device (MS) has a user interface (DPL1) that is protected by a motorized slide (SL1). The device has a first slide (SL1) which is moveable between positions in which it protects and exposes the user interface (DPL1). The slide is driven by an epicyclical gear which is, in turn, driven by an electrical motor. The epicyclical gear gears down a rotational speed provided by the motor into a rotational speed that is suitable for driving the slide.

15 Claims, 2 Drawing Sheets

PORTABLE ELECTRONIC DEVICE

FIELD OF THE INVENTION

This invention relates to electronic devices having covers and is particularly, but not exclusively, related to slideable covers to protect a user interface.

BACKGROUND OF THE INVENTION

Many electronic devices are equipped with a user interface comprising operating keys, a display or both. It is known to provide a slideable cover to protect such a user interface against damage, accidental activation and dust. Alternatively, it may be desirable to conceal the keys or some or all of the display for aesthetic reasons.

In hand held or portable electronic devices, such a slideable cover is usually moved by a user pushing and pulling it back and forth. Since this is a manual action, it may become annoying to the user if it must be repeated numerous times a day, for example in the case of a mobile telephone, whenever the telephone rings. To mitigate this problem certain handheld devices are provided with a spring-loaded mechanism to open the slideable cover in response to actuation of a release button. One example of this is the Nokia® 7110 mobile telephone. An advantage of this arrangement is that it can be simple, small and durable. This facilitates movement of a slideable cover to one direction, for example opening of a slideable cover for answering telephone calls, but even then the user needs to move it manually in the opposite direction.

In CD players which are fixed in location, that is not portable, motorised carriages have been used for receiving and transporting CDs into a playing position. These devices use toothed transmission. Dedicated power sensors are also provided to detect if excessive force is required in order to open or close the carriage. If excessive force is required, the motor is stopped.

Clearly, in a non-portable CD player, there is no problem in providing sufficient operating power to an electrical motor to drive a motorised carriage since it can derive its power from a mains supply or can have a large battery supply. However, in the case of portable CD players, these are usually battery powered with a small battery supply. Therefore, if the power provided by the battery supply falls to too low a level, insufficient operating power may be available to move a carriage for transporting a CD. In order to deal with this difficulty, portable CD players are provided with manually operated hinged covers which cover the playing position. When the playing position is uncovered, a CD is put directly in place without requiring any electrical power.

It is an object of the present invention to facilitate moving of one or more slideable elements of a portable device.

SUMMARY OF THE INVENTION

Now a portable user interface device has been invented that has a user interface and a motorised moveable element that moves in order to extend and compact the user interface.

According to a first aspect of the invention there is provided a portable electronic device comprising:
 a user interface;
 a first moveable element which is moveable between a first position in which a part of the user interface is covered and a second position in which that part of the user interface is uncovered;
 an electrical motor for converting electrical power into a first rotational movement having a first angular speed; and
 converting means for converting the rotational movement into a movement of the first moveable element between the first position and the second position.

Preferably, said converting means comprises a gear for converting the first rotational movement into a second rotational movement having a second angular speed that is slower than said first angular speed. Preferably, said gear is an epicyclic gear. Preferably the motor and gear are in line with each other.

Preferably, the device further comprises a rotatable element for converting said second rotational movement to a translational movement of said first moveable element. Preferably, the motor, gear and the rotatable element are in line with each other.

Preferably, the user interface has two configurations, a compacted configuration whereby the moveable element is in the first position and an expanded configuration whereby the moveable element is in the second position. Advantageously, when the user interface is in the compacted configuration, the device may readily be transported. When in the expanded configuration the user interface of the device may readily be used.

Preferably, the motor is connected to said moveable element using the gear and a rotating element with means for limiting the maximum force which the motor is subject to. The transmission between at least two parts in the transmission chain is based on a frictional contact in order to allow the motor to continue to run even when movement of the moveable element is prevented. In this way, the motor and the transmission components are not subject to excessive stresses. This limitation of the maximum force protects the motor and the transmission components.

Preferably, the electronic device comprises a second moveable element, which is moved between a third position and a fourth position by the electrical motor.

Preferably, the electrical motor is arranged to move the first moveable element and the second moveable element simultaneously. This allows provision of a user interface that has parts on both moveable elements and that extends to better expose the user interface to a user and compacts when the moveable elements are moved between their respective two positions.

The first and second moveable elements may move at different speeds.

The electrical motor may move the first moveable element and the second moveable element in opposite directions.

Preferably, the gear is an epicyclical gear. Preferably, the epicyclical gear has a frictional contact between two moving parts in order to allow the motor to continue to run even when movement of the moveable element is prevented. Hence, power transmission from the gear to the moveable element can be fixed, that is non-slipping, to reduce the influence that dust and dirt might have on slipping surfaces.

According to a second aspect of the invention, there is provided a portable electronic device having a user interface a method for moving a moveable element between a first position in which a part of the user interface is covered and a second position in which that part of the user interface is uncovered, comprising the steps of:
 converting electrical power into a first mechanical power in the form of rotation with a first speed by an electrical motor; and
 converting said second mechanical power to a movement of said moveable element.

Preferably, the method further comprises the step of converting the first mechanical power into a second mechanical power in the form of rotation with a second speed that is lower than said first speed by a gear.

The moveable element may be arranged to move by rotating to implement a rotating element such as a flap. Alternatively, the moveable element may be arranged to move by sliding on a linear or slightly arcing track to implement a sliding element. The invention may be applied to mobile telephones, mobile data terminals and remote controls of various appliances. Although the invention is especially suitable for small devices of approximately hand held size (since it helps in making devices smaller), it can also be used in larger devices where it can reduce the number of components which are needed.

BRIEF DESCRIPTION OF THE DRAWINGS

The invention will now be described, by way of example only, with reference to the accompanying drawings, in which.

DETAILED DESCRIPTION

Figure 1:
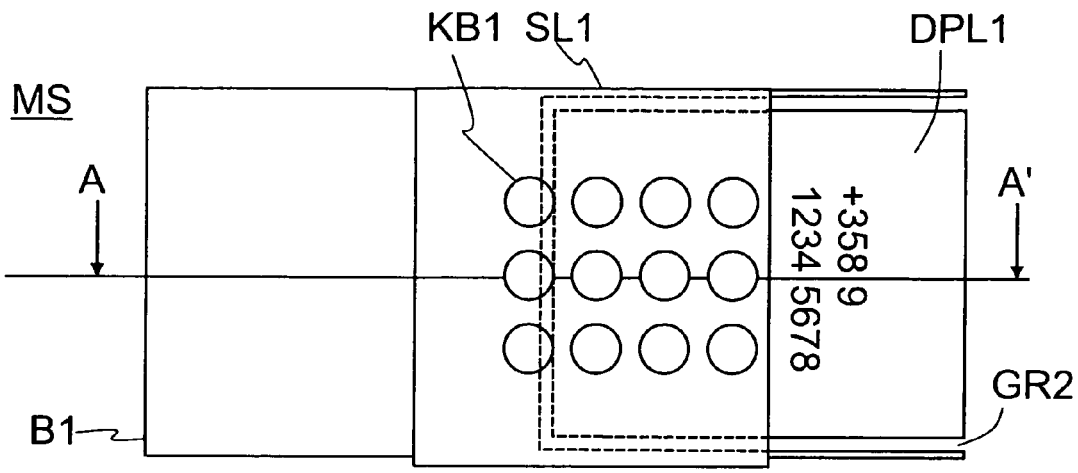
FIG. 1 shows a plan view of a mobile telephone according to the invention.

FIG. 1 shows a plan view of a mobile telephone MS according to the invention. The telephone comprises a body B1 having, at one of its ends, a space GR2 defined by side walls. The space GR2 occupies almost the complete width of the telephone. A display DPL1 is located in the space GR2. The display DPL1 is partially covered by a first slideable cover SL1. The first slideable cover SL1 comprises a keyboard KB1.

Figure 2:
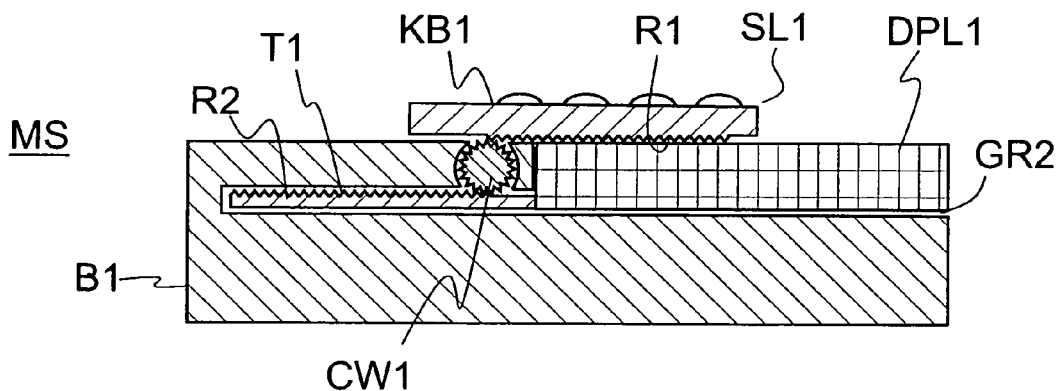
FIG. 2 shows a sectional view of the mobile telephone of FIG. 1.

FIG. 2 shows a sectional view of the mobile telephone MS of FIG. 1 taken along line A–A'. Interior detail of the body B1 can now be seen. A rotatable toothed wheel CW1 is located in the body and is in contact with a bottom surface of the first slideable cover SL1. The bottom surface of the first slideable cover SL1 has a track which carries teeth which engage with the teeth of the toothed wheel CW1 so that the toothed wheel CW1 moves the slideable cover when it rotates. The display DPL1 is also slideable. A tunnel-like space T1 is provided below the toothed wheel CW1 to accommodate a bar R2 which extends from the display DPL1. The bar R2 also has a track which carries teeth to engage with the teeth of the toothed wheel CW1 so that the toothed wheel CW1 moves the display DPL1 when it rotates. Thus anticlockwise rotation of the toothed wheel CW1 simultaneously moves the first slideable cover SL1 in one direction towards one end of the mobile telephone MS and the display DPL1 in an opposite direction. In this way, the user interface becomes quickly extended. Clockwise rotation causes the slideable cover SL1 and the display DPL1 to move towards each other.

Figure 3:
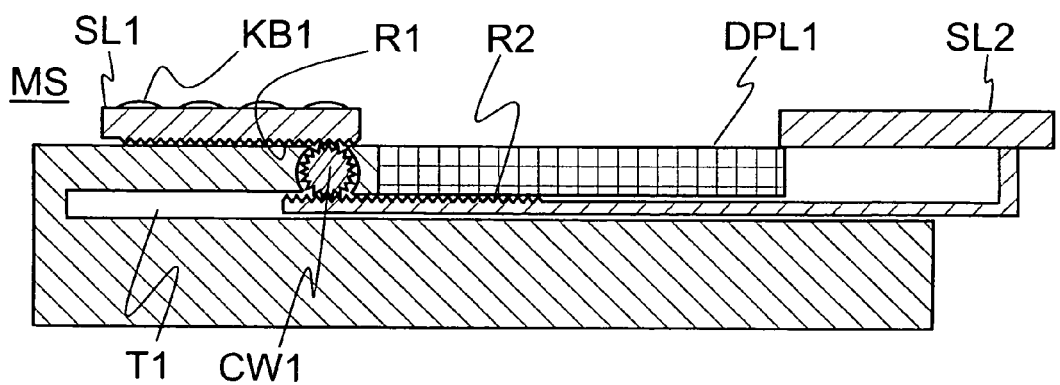
FIG. 3 shows a sectional view of a mobile telephone according to an embodiment of the invention.

FIG. 3 shows a sectional view of a mobile telephone MS according to another embodiment of the invention. In this embodiment, the mobile telephone has a body and a display DPL1 fixed relatively to the body. The mobile telephone MS also has two slideable covers SL1 and SL2, which move relatively to the display DPL1 and the body. A rotatable toothed wheel CW1 is located in the body and is in contact with a bottom surface of the slideable cover SL1. The bottom surface of the slideable cover SL1 has a track which carries teeth which engage with the teeth of the toothed wheel CW1 so that the toothed wheel CW1 moves the slideable cover when it rotates. A tunnel-like space T1 is provided below the toothed wheel CW1 to accommodate a bar R2 which extends from the slideable cover SL2. The bar R2 also has a track which carries teeth to engage with the teeth of the toothed wheel CW1 so that the toothed wheel CW1 moves the slideable cover SL2 when it rotates. Thus rotation of the toothed wheel CW1 simultaneously moves both slideable covers SL1 and SL2 in opposite directions. Depending on the direction of rotation, the slideable covers SL1 and SL2 will either move towards each other or away from each other. The second slideable cover SL2 can be, for example, a transparent lens to protect a touch screen against mechanical damage when the screen is not being used.

Figure 4:
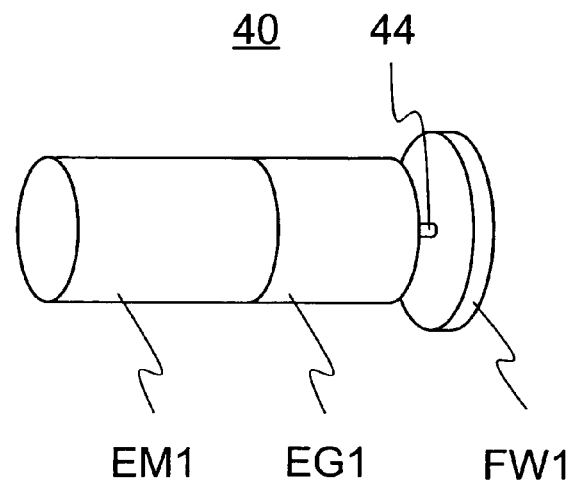
FIG. 4 shows an isometric view of an electrical driving system for a mobile telephone according to the invention.

FIG. 4 shows an isometric view of an electrical driving system 40 used in a mobile telephone MS according to another aspect of the invention (described below in relation to FIG. 5). The driving system comprises an electrical motor EM1, an epicyclic gear EG1, an axle 44 and a friction wheel FW1. The motor EM1, the epicyclic gear EG1, the axle 44 and friction wheel FW1 are connected in series along a common axis. The axle 44 connects the friction wheel FW1 to the epicyclic gear EG1 so that a rotational force generated by the motor EM1 will rotate the friction wheel FW1 with a smaller angular speed than that of the motor EM1, that is the friction wheel FW1 will have less revolutions per minute.

Namiki Corporation manufactures electrical motors and epicyclic gears suitable for this purpose. A particularly suitable epicyclic gear available from this manufacturer has a diameter of 7 mm and length of 5 mm. The corresponding dimensions of a suitable motor available from the same manufacturer are 7 mm and 16 mm.

A suitable gear ratio of the epicyclic gear is 400:1 so that the friction wheel FW1 has 1/400 speed of the motor. Reduction of the speed of the friction wheel naturally increases the force generated to move the moving parts.

The friction wheel could be of diameter of approximately 10 mm. The size can be chosen from a wide range, but the higher the diameter is, the more space the wheel consumes, and the smaller the wheel is, the higher the chance that the wheel will slide over a surface (SL1F or R2F in FIG. 5) against which it is pressed. Additionally, a small diameter of the friction wheel increases failure susceptibility of the friction wheel due to dust and dirt.

Naturally, components of other sizes can be used provided that there is sufficient space available for them in the mobile telephone and that the components give a sufficient power to move the moving parts with which the friction wheel FW1 bears the friction wheel against a slideable cover SL1F. A reasonable force on the friction wheel is a balance between two extremes. Too great a load on the bearings of the electrical driving system 40 or the driven surfaces causes excessive wearing. On the other hand, too small a load results in an insufficient friction and hence too slow movements of the driven slideable cover.

The periphery of the friction wheel FW1 can be made of neoprene based materials such as polyoxymethylene (POM), for example Fagerdala NA 515 (neoprene/EPDM ethylene/propylene/diene)

Fagerdala VT 510 (PVC polyvinyl chloride).

An alternative to locating these components inside the body of a mobile telephone is to locate some or all of the components outside the body, for example the friction wheel could be mounted beneath a slideable cover to be in contact with part of the slideable cover so that the friction wheel is easy to replace. Replacement of a worn friction wheel would simply involve removing the slideable cover, removing the worn friction wheel from the end of the axle 44 and inserting a new friction wheel in its place.

Although FIG. 4 shows an electrical driving system having a friction wheel, it can readily be applied to the embodiments of FIGS. 1, 2 and 3 if a toothed wheel is used. In that case, a toothed wheel is used instead of a friction wheel.

Figure 5:
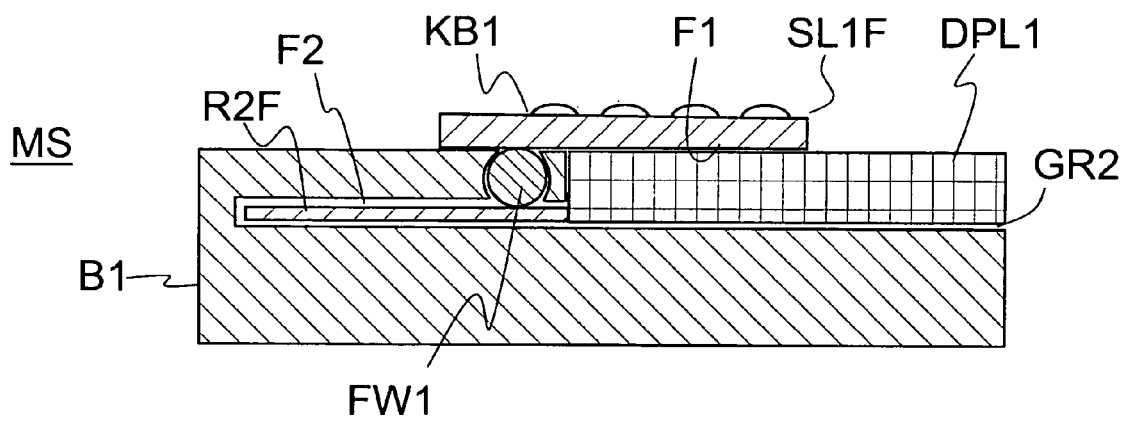
FIG. 5 shows a sectional view of an embodiment of the mobile telephone of FIG. 3.

An embodiment of a mobile telephone which uses the electrical driving system having a friction wheel, according to FIG. 4, will now be described by reference to FIG. 5 shows a sectional view of yet another embodiment of a mobile telephone. This embodiment resembles that shown in FIG. 2, but here a relatively smooth, non-toothed friction wheel is used instead of the toothed wheel. As mentioned above, this mobile telephone uses the driving system 40 of FIG. 4. Power transmission is based on frictional contact between the friction wheel FW1 and a bottom surface F1 of a first slideable cover SL1F as well as between the friction wheel FW1 and an upper surface F2 of a bar R2F transmitting force to a slideable display DPL1.

One advantage of having a system in which frictional contact is used in power transmission is that sliding contact between parts of the power transmission chain comprising the gear, the axle, and the friction wheel can be utilised should movement of any of them be prevented. This could happen, for example, if an obstacle were to prevent movement of one or both of the slideable parts. This is preferably implemented by allowing the friction wheel to slide against the surface or surfaces against which it bears. Alternatively, if a toothed wheel is used, sliding contact can be arranged to occur inside the epicyclic gear, between the gear and axle 44 or between the axle 44 and the toothed wheel.

The motor can be started, for example, by using a key of the keyboard or a force sensor to detect pushing/pulling action affecting a moving part, for example a slideable cover. In an alternative embodiment in which the mobile telephone has speech recognition means, the telephone may be adapted to start the motor in response to a spoken command, for example "open sesame".

In another embodiment of the invention, the motor operates a turnable flap. This is implemented by connecting the epicyclic gear to a hinge of the flap so that it turns the flap directly. Alternatively, the gear is not necessarily co-axially connected to the hinge. The flap extends over the hinge and forms an arc. A wheel is fitted against this arc. When the wheel rotates, it turns the flap about the hinge. The arc and the wheel may be toothed or they may be based on friction. In yet another alternative embodiment, the movement of the flap is implemented with translational transmission whereby the rotation generated by the motor is converted into a linear movement of a bar that pushes and pulls the flap open and closed.

The motorised movement can be used to move a wide variety of different elements including slideable covers, turnable flaps, SIM (Subscriber Identification Module) cards (for example with a friction wheel), displays, aerials, touch pens and extension cards to facilitate their insertion and removal. The motorised movement can be arranged to start as a function of certain logical event. Such events include starting or terminating a call to extend and to retract an aerial, opening a slideable cover in response to an incoming call or in response to initiation of an application to be used with a touch screen.

An advantage of the invention is that certain movement operations involved in using a portable electronic device can be carried out automatically and do not require action by a user. This is particularly advantageous in relation to single-handed operation of a hand held device.

Particular implementations and embodiments of the invention have been described. It is clear to a person ordinarily skilled in the art that the invention is not restricted to details of the embodiments presented above, but that it can be implemented in other embodiments using equivalent means without deviating from the characteristics of the invention. For example, the invention can be used to move only one or more than one part at the same time. The same motor can be arranged to move two parts in turn so that after moving one of two parts, the power transmission is shifted to move the other part. It is also possible to combine the invention with a spring actuated construction so that a resilient member causes one movement in one direction and an electrical motor causes movement in an opposite direction. Hence, the scope of the invention is only restricted by the attached patent claims.

What is claimed is:

1. A portable electronic device comprising:
    a user interface which is moveable;
    a first cover element which is moveable, relative to said user interface, between a first position in which a part of the user interface is covered and a second position in which that part of the user interface is uncovered;
    an electrical motor for converting electrical power into a first rotational movement having a first angular speed; and
    converting means operatively associated with said interface and said cover element for converting the rotational movement into a movement of the first cover element and said interface between the first position and the second position on a surface of the user interface, wherein said cover element moves opposite to said interface.

2. A portable electronic device according to claim 1, wherein said converting means comprises a gear for converting the first rotational movement into a second rotational movement having a second angular speed that is slower than said first angular speed.

3. A portable electronic device according to claim 2, wherein said gear is an epicyclic gear.

4. A portable electronic device according to claim 2, wherein the motor and gear are in line with each other.

5. A portable electronic device according to claim 2, wherein
    the device further comprises a rotatable element for converting said second rotational movement to a translational movement of said first cover element.

6. A portable electronic device according to claim 5, wherein the motor, gear and the rotatable element are in line with each other.

7. A portable electronic device according to claim 1, wherein the user interface has two configurations, a compacted configuration whereby the first cover element is in the first position and an expanded configuration whereby the first cover element is in the second position.

8. A portable electronic device according to claim 1, wherein the portable device comprises a second moveable cover element which is moved between a third position and a fourth position by the electrical motor.

9. A portable electronic device according to claim 8, wherein the electrical motor is arranged to move the first cover element and the second moveable cover element simultaneously.

10. A portable electronic device according to claim 8, wherein
the first cover element and the second moveable cover element are arranged to move at different speeds.

11. A portable electronic device according to claim 8, wherein
the electrical motor is arranged to move the first cover element and the second moveable cover element in opposite directions.

12. In a portable electronic device having a user interface a method for moving a cover element between a first position in which a part of the user interface is covered and a second position in which that part of the user interface is uncovered, comprising the steps of:
converting electrical power into a first mechanical power in the form of rotation with a first speed by an electrical motor; and
converting said first mechanical power to a movement of said cover element and said user interface between the first position and said second position on a surface of the user interface, wherein said cover element moves opposite to said user interface.

13. A method according to claim 12, further comprising the step of converting the first mechanical power into a second mechanical power in the form of rotation with a second speed that is lower than said first speed by a gear.

14. A portable electronic device according to claim 1, wherein said interface is mounted on the device for sliding movement and said converting means comprises a gear driven by said electric motor, said gear engaging a first toothed surface on the cover element and a second toothed surface on said interface wherein rotation of the gear causes movement of the cover element and interface in opposite directions.

15. A portable electronic device, according to claim 1, further comprising a second cover element mounted for sliding movement from a first position partially covering said interface and a second position in which that part of the user interface is uncovered, wherein said converting means comprises a gear driven by said electric motor, said gear engaging a first toothed surface on the first cover element and a second toothed surface on said second cover element wherein rotation of the gear causes movement of the first and second cover elements in opposite directions.

* * * * *